(12) United States Patent
Nishita et al.

(10) Patent No.: US 9,200,636 B2
(45) Date of Patent: Dec. 1, 2015

(54) PLASTIC HOUSING OF A RADIAL FLOW COMPRESSOR

(75) Inventors: Kenji Nishita, Osaka (JP); Antonius M Vet, Sittard (NL)

(73) Assignee: DSM IP ASSETS B.V., Heerlen (NL)

( * ) Notice: Subject to any disclaimer, the term of this patent is extended or adjusted under 35 U.S.C. 154(b) by 951 days.

(21) Appl. No.: 13/265,052

(22) PCT Filed: Apr. 20, 2010

(86) PCT No.: PCT/EP2010/055208
§ 371 (c)(1),
(2), (4) Date: Dec. 30, 2011

(87) PCT Pub. No.: WO2010/122026
PCT Pub. Date: Oct. 28, 2010

(65) Prior Publication Data
US 2012/0099980 A1 Apr. 26, 2012

(30) Foreign Application Priority Data
Apr. 22, 2009 (EP) ..................... 09158481

(51) Int. Cl.
*F04D 29/02* (2006.01)
*B29C 45/00* (2006.01)
*F04D 29/42* (2006.01)

(52) U.S. Cl.
CPC .......... *F04D 29/023* (2013.01); *B29C 45/0062* (2013.01); *F04D 29/4206* (2013.01); *F05C 2225/06* (2013.01); *F05C 2225/08* (2013.01); *F05C 2253/04* (2013.01)

(58) Field of Classification Search
CPC . B29C 45/006; B29C 45/0062; F04D 29/023; F04D 29/4206; F05C 2230/04; F05C 2225/06; F05C 2225/08
USPC .......... 415/200, 203, 204, 205, 206
See application file for complete search history.

(56) References Cited

U.S. PATENT DOCUMENTS 5,810,556 A * 9/1998 Northam et al. ............ 415/200
5,900,089 A * 5/1999 Northam et al. ............ 156/155
(Continued)

FOREIGN PATENT DOCUMENTS

DE 2706110 8/1978
DE 102007055615 * 5/2009 ............ F04D 29/02
(Continued)

OTHER PUBLICATIONS

Rapra Review Report, vol. 11, No. 1, Report 121, 2000, p. 9-10.*
(Continued)

*Primary Examiner* — Dwayne J White
*Assistant Examiner* — William Grigos
(74) *Attorney, Agent, or Firm* — Nixon & Vanderhye P.C.

(57) ABSTRACT

The invention relates to a housing (1) of a radial flow compressor, comprising an intake pipe (4), a compressor duct (7) and an outlet pipe (5), wherein the housing comprises a housing body (basic construction) comprising at least an upper housing member (3) and a lower housing member (2) made of a fiber-reinforced thermoplastic polymer composition, and wherein the members (2, 3) are made, assembled together and fixed to each other in an integrated 2-step injection molding process. The invention also relates to a process for producing a housing for a radial flow compressor, comprising an intake pipe, a compressor duct and an outlet pipe, comprising steps of a) melt processing of a fiber-reinforced thermoplastic polymer composition thereby forming a polymer melt, b) injection molding the polymer melt into a molding die comprising at least two cavities, thereby forming at least two members comprising at least an upper housing member and a lower housing member, c) assembling the at least two members together, thereby forming a housing body defining the intake pipe, the compressor duct and the outlet pipe, and d) fixing the assembled at least two members to each other.

12 Claims, 5 Drawing Sheets

(56) References Cited

U.S. PATENT DOCUMENTS

| | | | |
|---|---|---|---|
| 5,947,682 A * | 9/1999 | Moon | 415/200 |
| 5,961,281 A * | 10/1999 | Ojima et al. | 415/173.6 |
| 7,086,833 B2 * | 8/2006 | Cvjeticanin et al. | 415/215.1 |
| 2004/0223847 A1 | 11/2004 | Cvjeticanin et al. | |
| 2007/0199727 A1 * | 8/2007 | Cvjeticanin et al. | 174/50 |
| 2008/0034754 A1 * | 2/2008 | Hummel et al. | 60/605.2 |
| 2008/0146717 A1 * | 6/2008 | Gijsman et al. | 524/431 |
| 2008/0304960 A1 * | 12/2008 | Cvjeticanin et al. | 415/200 |
| 2009/0053051 A1 * | 2/2009 | Cvjeticanin | 415/200 |
| 2010/0232955 A1 * | 9/2010 | Schick et al. | 415/204 |
| 2011/0097194 A1 * | 4/2011 | Schick et al. | 415/119 |

FOREIGN PATENT DOCUMENTS

| | | |
|---|---|---|
| EP | 1950420 | 7/2008 |
| WO | WO 2005/007727 | 1/2005 |

OTHER PUBLICATIONS

International Search Report for PCT/EP2010/055208 mailed Jul. 13, 2010.

* cited by examiner

PLASTIC HOUSING OF A RADIAL FLOW COMPRESSOR

This application is the U.S. national phase of International Application No. PCT/EP2010/055208 filed 20 Apr. 2010 which designated the U.S. and claims priority to EP 09158481.3 filed 22 Apr. 2009, the entire contents of each of which are hereby incorporated by reference.

The present invention relates to a housing of a radial flow compressor, more particular for a turbocharger for automobiles, and more specifically a housing made of a plastic. The invention also relates to a process for making the plastic housing.

Radial flow compressors, such as turbochargers, are installed in the region of the intake tract of a motor vehicle, in order to supply the greatest possible quantity of fresh air in the cylinder. In this way air should already be pre-compressed outside of the cylinder. On the basis of the great pressures occurring within the housing of a radial flow compressor the housing is to be constructed sufficiently sturdy.

Automobiles are nowadays often provided with a turbocharger. A conventional housing for a turbocharger is made of aluminum. In recent years, automobile parts made of metal tend to be replaced by those made of a plastic in order to reduce weight and to enable further function integration. However, using a plastic to form a housing for the turbocharger has not been in actual practice yet. This is mainly because the housing for the turbocharger requires long-term heat resistance against relatively high temperatures, fatigue strength, and pressure resistance and, further, lacks dimensional stability and stability of performance.

In addition the charger housings are to be designed fluid tight in order to be able to hold the desired high pressures in the interior of the housing. With regard to the impermeability of such housings frequently single-piece manufactured turbocharger housings are used. Due to the lack of joint gaps single-piece turbochargers are less susceptible with regard to leak formation.

Such a housing is known from patent application US-2009/0053051-A1. This document describes a plastic compressor housing comprising at least one thermosetting body for providing an intake pipe, a compressor duct and an outlet pipe, and a thermoplastic material injection molded over the thermosetting body and at least partially covering the thermosetting body.

According to US-2009/0053051-A1 a thermosetting plastic housing has the disadvantage that it can easily be destroyed, in particular when employed in a turbocharger, if a fan impeller splinters in the turbocharger. This could involve the risk of damage to a motor vehicle in which the turbocharger is installed as well as risk of injury to people. These risks are reduced and the structural strength of the housing is improved when the thermosetting plastic body is at least partially covered by the thermoplastic in a hood like fashion. This thermoplastic reinforcement is especially important for a reliable mounting on anchoring elements. The thermosetting plastic housing is mounted on anchoring elements in the form of bars. These bars together with the shape of the thermosetting plastic housing determine the shape of the compressor duct. Special measures have to be taken to provide a sustainable bond between the two components. As said in US-2009/0053051-A1, sliding a thermoplastic reinforcement over a thermosetting plastic body is insufficient, and the fact that a thermosetting plastic body must be tempered at high temperature, prohibits processing together with a thermoplastic reinforcement.

A single-piece turbocharger housing made of thermoplastic polymers is known from DE-10112764-A1. This radial flow compressor was produced applying a lost core injection molding technology, wherein a molded shape made from a low melting metal alloy is used, which after the injection molding of the thermoplastic material is molten and removed. With such housings it is a disadvantage that time-consuming die work and subsequent machining are necessary for complicated housing constructions, which causes high manufacturing costs. Under the circumstances, a time-consuming core melting procedure can be used, which in particular in the case of thermosetting plastic materials does not permit sufficiently precise dimensioning of the housing. Although one could use lost core molded shapes with complex shapes, e.g. to produce a housing with a compressor duct with a circular like cross section, this technology for making the housing is very complex and very expensive in scale up. Apart from that, as stated in US-2009/0053051-A1, a thermoplastic housing is not suitable for use as turbocharger housing due to inadequate stability.

A two piece housing for a radio flow compressor is known from US2004/0223847 A1. The housing of US2004/0223847 A1 has first and second housing parts firmly connected to one another. A channel system is provided wherein each housing part has at least a portion of the channel system therein such that with the two housing parts joined together, the channel system is formed. A solidified compaction material is provided in the channel system such that the channel system together with the compaction material bond the first and second housing parts to one another. The compaction material achieves a certain firmness after insertion on the basis of its shape in the channel system which interlocks the two housing parts. The resulting wedging forces, which are introduced by compaction material into the housing parts, prevent the loosening of the housing parts.

The two pieces of the flow processor are made of thermoset material, while the compaction material is made of thermoplast material. It is noted that the second part is merely an inserted part to define the inner shape of the compressor duct. The outer wall, bearing the high pressures load in the interior of the housing, is completely formed by the first part, while the second part is inserted inside the first part, and than fixed in said position by the solidified compaction material. The second part and the fixation do no bear any pressure load. Furthermore, the channel parts are formed by undercuts in the first and second parts. The undercuts are such that these complicate production enormously.

In view of the problems described above, and the pressure on weight reduction in all automotive parts, there is a need for a housing for turbocharger for automobiles and other radial flow compressors, that are strong and durable, can be more easily produced, and can be shaped in more complex shapes.

The aim of the present invention is to solve at least part of these problems. It is one object to provide a housing for a radial flow compressor that can withstand the high impermeability requirements of such a compressor, and whereby simple producibility and a highly-precise dimensioning of the housing are guaranteed. It is another object to provide a process or method for the manufacturing of the housing, that is less complicated than the processes described above, whereby meanwhile the housing to be created has the required properties mentioned here above.

One embodiment of the invention relating to a housing of a radial flow compressor, comprising an intake pipe, a compressor duct and an outlet pipe. The housing according to the invention comprises a housing body comprising at least an upper housing member and a lower housing member made of a fiber-reinforced thermoplastic polymer composition, and wherein the members are made, assembled together and fixed to each other in an integrated 2-step injection molding process.

Another embodiment of the invention relates to a process for producing a housing for a radial flow compressor. The process according to the invention is an integrated process comprising steps of a. melt processing of a fiber-reinforced thermoplastic polymer composition thereby forming a polymer melt,
b. injection molding the polymer melt into a molding die comprising at least two cavities, thereby forming at least two members, comprising at least an upper housing member and a lower housing member,
c. assembling the at least two members together, thereby forming a housing body defining the intake pipe, the compressor duct and the outlet pipe, and
d. fixing the assembled members to each other by injecting molding of a second shot of a thermoplastic molding composition.

The housing for the radial flow compressor of the present invention, in particular for a turbocharger for automobiles, has a practical performance as a substitute for a conventional housing made of aluminum, but is of much lower weight. The consequence of the housing according to the invention comprising an upper housing member and a lower housing member is that the housing has an assembly line in the outer wall of the housing. The effect of the housing according to the invention wherein the members are made of a fiber-reinforced thermoplastic polymer composition and assembled together in an integrated 2-step injection molding process is that simple producibility and highly-precise dimensioning thereof is guaranteed. Moreover, the housing can be made such that it can withstand the high impermeability requirements for a radial flow compressor. The effect of the housing according to the invention is that it can easily be produced, for example by injection molding in a multi-cavity single mold, can be made in variable and complex shapes, can be made with sufficient structural strength meanwhile limiting the weight of the housing, and can be provided with adequate stability by choosing an appropriate fiber reinforced thermoplastic polymer composition.

Disclosed herein are various embodiments of the plastic housing according to the invention, as well as a process for making the plastic housing, which overcome one or more of the problems of the prior art as described above.

It is noted that from the embodiments described below it will be clear that the upper member of the housing is that part of the housing that is positioned closest to the inlet pipe, or even be integrated with the inlet pipe, and that the lower member is the part further away from the inlet pipe.

In a first embodiment, the members in the plastic housing comprise an upper housing member and a lower housing member, wherein the intake pipe constitutes in integral part of the upper housing member, whereas the outlet pipe constitutes in integral part of either the upper housing member or the lower housing member. The compressor duct is defined by the assembly of the upper housing member and the lower housing member. The shape of the compressor duct can be more freely designed and can be more complex. The outlet pipe integrated with the upper housing member has the advantage that a stronger construction is obtained.

Furthermore, reinforcing ribs simultaneously reinforcing the inlet pipe and the upper housing member may be integrated the design of the upper housing.

In a second embodiment, the members in the plastic housing comprise an upper housing member comprising an integrated outlet pipe, with a funnel member is a separate member. The upper housing member comprises an opening for receiving the funnel member. The funnel member is a separate member constituting the inlet pipe. The compressor duct is defined by the upper housing member in combination with the mounting device on which the upper housing member has to be mounted. The advantage of a separate upper housing member and inlet pipe is that a compressor duct with a more complex shape and undercuts can be defined, without complicating the production process.

In a third embodiment, the members in the plastic housing comprise at least three members including a funnel member, an upper housing member, and a lower housing member. The funnel member defines the intake pipe.

The assembled upper housing member and the lower housing member together define the compressor duct. The advantage of this embodiment is that a housing with an even more complex shaped compressor duct may be designed. Optionally the upper housing member or the lower housing member comprises an integrated outlet pipe. Otherwise the outlet pipe is formed by the combination of the upper housing member and the lower housing member. The construction wherein the outlet pipe is an integral part of either the upper housing member or the lower housing member results in a stronger structural integrity.

In a preferred embodiment of the housing according to the invention, the funnel member has a tapered shaped with two different end-sections, being a large end-section and a small end section, wherein the large end section is larger than the opening in the upper housing member and the other end section, i.e. the small end-section, is smaller than said opening. The small end-section may well have the form of a regular tube, while the large end-section in this funnel member suitably has a trumpet like shape. The advantage of this embodiment is that the housing comprising the said funnel member can be designed to fit well with the compressor wheel, with a narrow gap between the funnel member and the compressor wheel, meanwhile obtaining a high dimensional accuracy and stability for that gap. These aspects contribute in large extent to a better performance of the housing.

In the said preferred embodiment, the funnel member and the upper housing member are assembled such that the large end section is positioned inside the housing and co-defines the compressor duct, and the small end-section is positioned at an external position. An additional advantage of this embodiment is that the intake pipe is more securely fixed to the housing construction and that, under circumstances wherein the internal pressure inside the housing is high, the risk of separation of the intake pipe from the upper housing member is reduced.

In another embodiment of the invention the housing comprises a funnel member, in which at least the large end-section comprises a metal insert, or wherein the funnel member is made of metal. The large end-section suitably has a trumpet like shape. The metal insert, or where applicable the metal funnel member, can be easily shaped in the desired shape, e.g. in a trumpet like shape. The shaping may be done starting from a piece of a metal tube and deep drawing of the piece or part of it. The metal insert can be overmolded with a fiber reinforced thermoplastic composition, thereby forming the funnel member with the metal insert integrated therein.

The advantage of the embodiment comprising the metal funnel member or wherein the funnel member comprises a metal insert in the large end-section is that the housing has an even better dimensional stability and can withstand even higher impacts during a containment test, mimicking the event that the compressor wheel breaks down.

The fiber-reinforced thermoplastic polymer composition used for making the members in the plastic housing according to the invention may be any fiber-reinforced thermoplastic polymer composition that is suitable for injection molding and has good durability properties at elevated temperature.

In a preferred embodiment, the, fiber-reinforced thermoplastic polymer composition has a tensile strength half-life of 1,000 hours at 150° C., more preferably at least 2,000 hours or even better at least 3000 hours at 150° C., as determined in an aging test in air. The advantage is that the plastic compressor housing has an improved durability.

For the ageing test, the tensile strength half-life of the fiber-reinforced thermoplastic polymer composition in air is determined by an aging test according to the test method for vulcanized rubber as described in JIS (Japanese Industrial Standards) K6257. First, dumbbell specimens according to ISO 527 of the fiber-reinforced thermoplastic polymer composition are produced and a tensile test is conducted at 23° C. to find the initial tensile strength, $TS_0$. The tensile test and the further tests are conducted on samples dry as molded. Thereafter, a large number of dumbbell specimens necessary for the tensile test are put in an air-heated oven set to a predetermined temperature. After a certain period of time, a small number of the specimens is taken out, allowed to cool to room temperature and, thereafter, subjected to the tensile test at 23° C. to find the tensile strength for that first period of time $TS_1$. In this manner, $TS_1$, $TS_2$, etcetera and $TS_x$ are found for different periods of time. The time N needed to reach $TS_N/TS_0=0.5$ is defined as the half-life at the predetermined temperature. The tensile strength half-life is preferably at least 1,000 hours at 180° C., more preferably at least 3,000 hours at 180° C.

The fiber-reinforced thermoplastic polymer composition comprises reinforcing fibers. The reinforcing fibers may in principle be any reinforcing fiber suitable for use in thermoplastic polymer compositions intended for high temperature applications. Suitably the reinforcing fibers are chosen from glass fibers, carbon fibers, metal fibers and aromatic amide fibers, also known as aramide fibers, preferably the reinforcing fibers comprise or even fully consist of glass fibers and/or carbon fibers, still more preferable carbon fibers. The advantage of these fibers is that they reduce weight compared to metal fibers, have a good thermal stability and have a high contribution to the overall strength of the thermoplastic polymer composition.

The reinforcing fibers may be present in the thermoplastic polymer composition in an amount varying over a large range. Suitably, the fiber-reinforced thermoplastic polymer composition comprises reinforcing fiber in an amount of 20 to 80% by weight, preferably 30-70% by weight, or even better 40-60% by weight, relative to the weight of the of the fiber-reinforced thermoplastic polymer composition.

The fiber-reinforced thermoplastic polymer composition comprises a thermoplastic polymer. The thermoplastic polymer may in principle be any thermoplastic polymer suitable for use in injection moldable thermoplastic polymer compositions intended for high temperature applications. Suitably, the thermoplastic polymer is selected from the group consisting of polyimides, phenolic resins, polyetheretherketons, polyamido-imides, polyethersulfones, polyphenylene sulfides, and polyamides. Preferably, the thermoplastic polymer is an amorphous polymer having a glass transition temperature (Tg) of at least 220° C., more preferably at least 250° C. or is a semi-crystalline polymer having a melting temperature (Tm) or of at least 220° C., more preferably at least 250° C. With the term melting temperature is herein understood the temperature, measured according to ASTM D3418-97 by DSC with a heating rate of 10° C./min, falling in the melting range and showing the highest melting rate. With the term glass transition temperature is herein understood the temperature, measured according to ASTM E 1356-91 by DSC with a heating rate 10° C./minute and determined as the temperature at the peak of the first derivative with respect of time of the parent thermal curve corresponding with the inflection point of the parent thermal curve.

The composition may further comprise one or more additives. These additives can be any additive that is suitable for use in fiber-reinforced thermoplastic polymer compositions. Suitable additives include the usual additives like heat stabilizers, anti-oxidants and UV-stabilizers, processing aids, such as lubricants and mold release agents, pigments and colorants, nucleating agents, flame retardants, and fillers. The mentioned and further suitable additives are described, for example, in Gächter, Müller, Kunststoff-Additive, 3. Ausgabe, Hanser-Verlag, München, Wien, 1989 and in Plastics Additives Handbook, 5th Edition, Hanser-Verlag, München, 2001. The additives can be used alone or in combination, and can be sourced in pure form or e.g. in the form of master batches.

In a preferred embodiment, the polymer is a polyamide, more preferable comprising polyamide-46, either as such or in combination with another polyamide.

Still more preferable, the fiber reinforced polymer composition is a heat stabilized composition comprising a polyamide, or a blend of polyamides and a stabilizing system comprising iron metal particles and/or an iron oxide. Such heat stabilized polyamide compositions are described in patent applications WO-2005/007727-A1 and WO-2006/074934-A1, which are herein cooperated by reference.

The housing for a radial flow compressor according to the invention and the various embodiments thereof, comprising an intake pipe, a compressor duct and an outlet pipe, can be made by an integrated process comprising steps of a. melt processing of a fiber-reinforced thermoplastic polymer composition thereby forming a polymer melt,
b. injection molding the polymer melt into a molding die comprising at least two cavities, thereby forming at least two members, comprising at least an upper housing member and a lower housing member,
c. assembling the at least two members together, thereby forming a housing body defining the intake pipe, the compressor duct and the outlet pipe, and
d. fixing the assembled members to each other by injecting molding of a second shot of a thermoplastic molding composition.

Forming the at least two members in a multi-cavity single molding die, as in to the process according to the invention, has the advantage that the members go through the same temperature history, thereby providing the best guarantee for a good dimensional fit and optimal assembly of the two parts.

In the process according to the invention, the steps a), b), c) and d) are integrated in a single process and the injection molding, assembling and fixing is done in the same mold by injection molding of a polymer melt for first making the embers, and than injection molding of a second shot of a thermoplastic molding composition for the fixation. By molding the housing in the form of separate members in an integrated process as according to the invention, the housing even when having a complicated shape, can be manufactured efficiently. The advantage of such a process is it can be fully automated and there is the least risk of dimensional changes of any of the members leading to misfit between the different members. This integrated process allows the best control over the gap between the housing, or the funnel member therein, and the compressor wheel to be comprised by the housing.

The fixing of the assembled members in the integrated process can de done by overmolding and/or infill molding, or a combination thereof, of at least a part of each of the members. Such a molding method can be done by a 2-step injection molding process. The housing according to the invention can be produced by such a process comprising steps wherein the first and second plastic housing members and optional further plastic parts are produced by injection molding of the molding composition into a multi-cavity mold, the first and second plastic housing members and the optional further plastic parts are repositioned such that a first rim part of the first member is positioned against a second rim part of the second member, and the first and second rim part are overmolded with, or connected through and bonded by a thermoplastic molding composition in a second injection molding step.

By applying such a process a high bonding strength between the members is attained. The overmolding and/or infill molding may be done by using for the second injection molding step the same fiber-reinforced thermoplastic polymer composition (1 composition molding, or 1-C molding) or with another thermoplastic polymer composition (2 compositions molding, or 2-C molding). Preferably a 2-C molding process is applied wherein the other thermoplastic polymer composition is injected as a polymer melt with a melt temperature Tm above the Tg or the Tm of the fiber-reinforced thermoplastic polymer composition. This results in an even better bonding between the members themselves and between the members and the other polymer.

The overmolding can advantageously be used to create additional reinforcing elements as well as additional anchoring elements, for example for mounting on a bearing structure or attaching of a fluid guide element.

The housing in the process according to the invention may be any housing for a radial flow compressor according to the present invention, including all embodiments thereof.

The invention also relates to a housing for a radial flow compressor obtainable with a process according to the invention and any embodiment thereof. The invention also relates to the use of the housing according to the present invention and any embodiment thereof, for a turbocharger for automobiles.

FIGURES

FIG. 1. A perspective view of a housing according to the present invention.

FIG. 2. A cross-sectional view of the housing according to the present invention.

FIG. 3. A cross-sectional view of an upper housing portion of a molding die, in which an upper housing member is formed.

FIG. 4. A cross-sectional view of a lower housing portion of a molding die, in which a lower housing member is formed.

FIG. 5. A cross-sectional view showing an assembly state of a molding die, where a funnel member, an upper housing member, and a lower housing member are assembled in the die.

BRIEF DESCRIPTION ON THE FIGURES

FIG. 1 is a perspective view of a housing (1) of the present invention, constructed from a lower housing member (2), an upper housing member (3) and a funnel member (4), which latter has the function of intake pipe. The dotted lines show boundaries of individual members. The upper housing member (3) comprises an integrated outlet pipe (5).

FIG. 2 shows a cross-sectional view of the housing (1) constructed from a lower housing member (2), an upper housing member (3) and a funnel member (4). The funnel member has a large end section with a trumpet shape. These three members are molded all in one die, moved to approach one another, and are integrated and bound to each other by welding at the boundaries to form the housing. The welding has been accomplished by injection molding of funnel member, a bonding material along the weld lines. The housing member (2), the upper housing member (3) and the funnel member (4) define together the shape of the compressor duct (7). In this embodiment the compressor duct can have a circular like cross-section as is schematically shown in FIG. 2. The lower housing member (2) comprises a flange (8) and mounting seats (9) integrally molded with the lower housing member (2), which contribute to the structural strength of the housing. The compressor wheel in the turbocharger shall be comprised by the housing in the open space inside and below the trumpet shaped part of the funnel member.

Cavities for three members are separately provided in a single molding die. A cross-sectional view of the funnel portion of the die is omitted here. During the injection molding process the molten reinforcing fiber-containing polymer composition is injected via the runners into the cavities for the individual members. After the temperature of the injection molded reinforcing fiber-containing polymer composition lowers to an appropriate temperature at which the injection molded parts do not lose their shape, the die is opened. Next, the upper housing member and the funnel member are inserted in the lower housing portion by a transfer means. This state is illustrated in FIG. 5.

Figure 1:
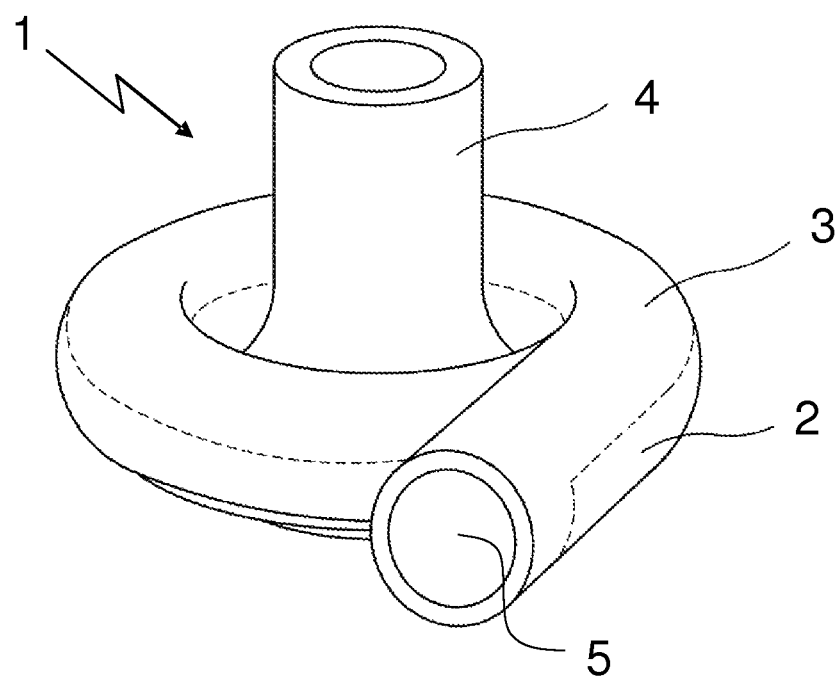
Figure 2:
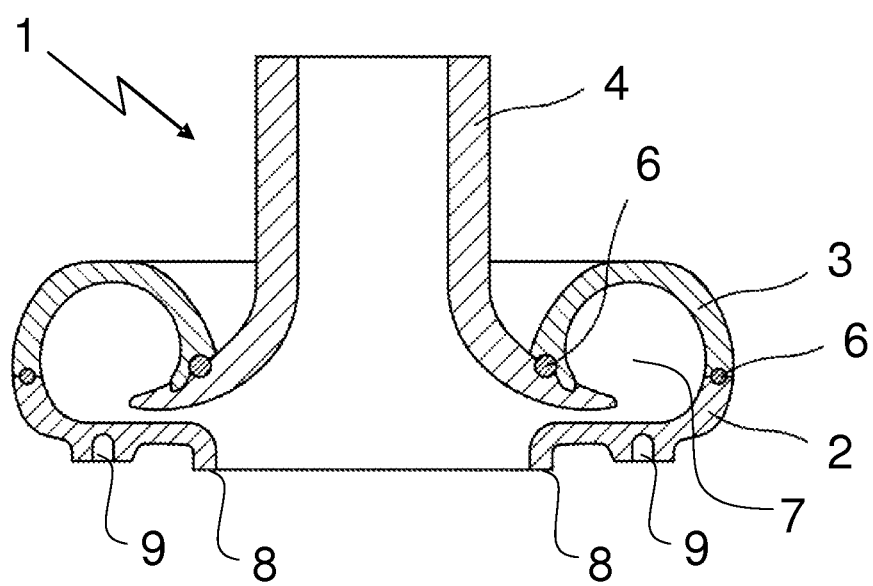
Figure 3:
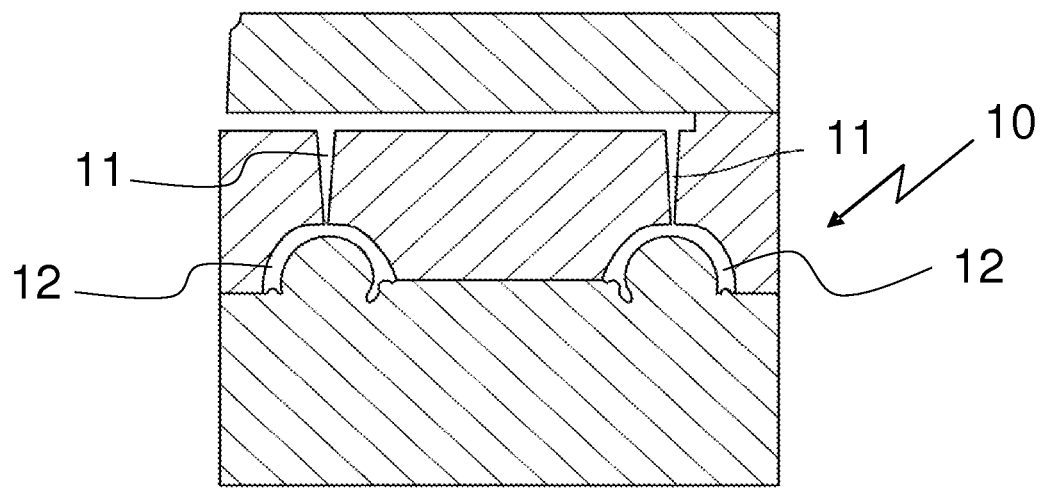
FIG. 3 shows a cross section of an upper housing portion of a molding die (10), which is to form the upper housing member. Numeral 11 indicates a runner for primary molding, that is, molding of the upper housing member, to be formed in cavity (12).
Figure 4:
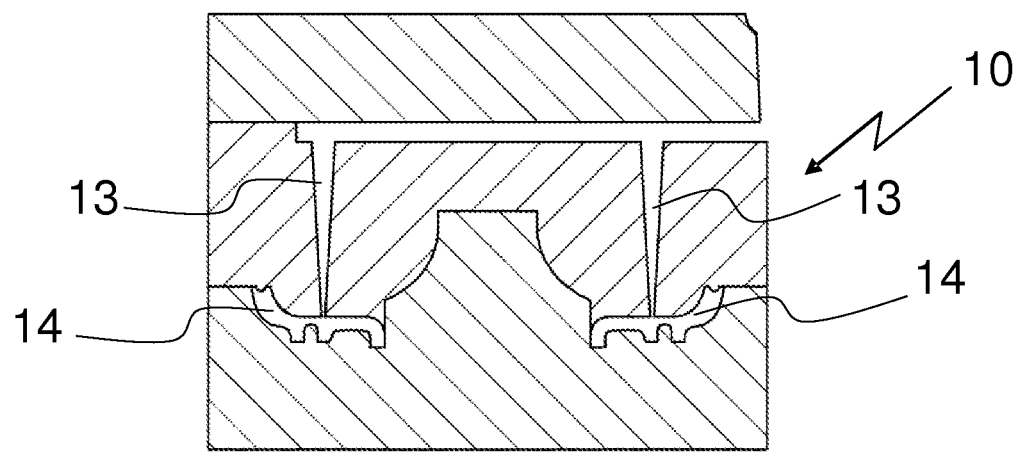
FIG. 4 shows a cross section of a lower housing portion of the molding die (10), which is to form the lower housing member. Numeral 13 indicates a runner for primary molding, that is, molding of the upper housing member, to be formed in cavity (14).
Figure 5:
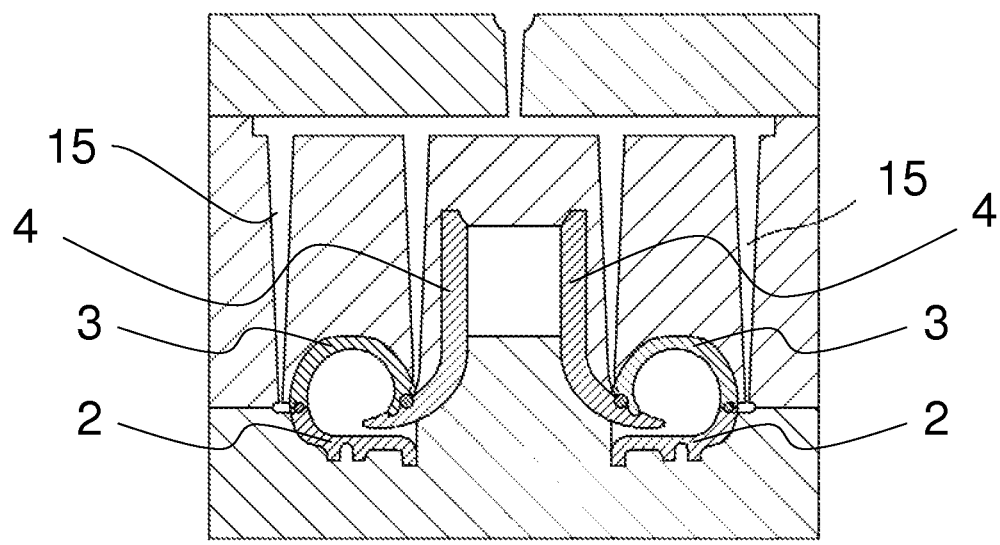

FIG. 5 shows the reassembled mold with individually molded lower housing member (2), an upper housing member (3) and a funnel member (4) assembled together.

Then, a second shot of reinforcing fiber-containing polymer composite is injected via runner 15 for secondary molding to fill the boundaries between the members, thereby fixing the members together. After the temperature of the molded body lowers to an appropriate temperature, the die is opened and the product is taken out.

The above description is just illustrative, and the invention is not limited to this. It is also possible to fabricate the housing for the turbocharger for automobiles of the present invention in other manners by the two-step injection molding method. For example, the second injection molding step may be used to overmold larger parts of the members and to create further ribs, flanges etc, to further strengthen housing, meanwhile keeping the weight of the housing low compared to a metal housing.

The invention is further illustrated with the following example.

Example 1

Stanyl Diablo OCD2100, a fiber-reinforced thermoplastic and heat stabilized PA46 composition, was used as the material. A 2-cavity mold of the type of die slide injection molding, modeled for a compressor housing with a diameter of about 10 cm, with a cavity for an upper member and a lower member was integrated in a injection molding set up including a injection molding extruder. The temperature settings and injection pressures of the injection molding extruder and the temperature settings of the mold were adjusted to standard molding conditions for the Stanyl material. The material was injected into the two cavities, the cavities were repositioned such that the two molded parts were positioned next to each other such as to form the shape of the compressor housing while leaving an open channel at the contact area between the two parts, and injection molding a second shot of the material into the channel. After allowing the housing thus formed to cool into the mold according normal molding sequences, the housing was demolded. The part was allowed to cool to room temperature.

A series of housings were produced in the same way.

The housings were tested with regard to their pressure resistance. For that purpose the parts were connected to a water pressure unit to allow water to enter. Any remaining openings in the parts were closed securely. The water pressure was slowly increased and the burst pressure was registered.

The average value for the burst pressure was 2.8. This illustrates that the housing according to the invention made of a fiber-reinforced thermoplastic polymer composition, made by a integrated 2-step injection molding process, results in a strong pressure resistant compressor housing.

The invention claimed is:

1. A housing for a radial flow compressor, the housing comprising:
    an intake pipe,
    a compressor duct,
    an outlet pipe, and
    a housing body made of a fiber-reinforced thermoplastic polymer composition and comprising at least an upper housing member and a lower housing member, wherein the upper and lower housing members are made, assembled together and fixed to each other in an integrated 2-step injection molding process whereby the upper and lower housing members are formed of a first injection molding shot of the fiber-reinforced thermoplastic polymer composition so as to define boundary spaces therebetween, and a second injection molding shot of the fiber-reinforced thermoplastic polymer composition fills the defined boundary spaces between the upper and lower housing members to thereby integrally fix one to another.

2. The housing according to claim 1, wherein the upper housing member comprises an integrated intake pipe.

3. The housing according to claim 1, wherein the housing further comprises a funnel member.

4. The housing according to claim 1, wherein the fiber-reinforced thermoplastic polymer composition has a tensile strength half-life of at least 3,000 hours at 150° C., as determined in an aging test according to JIS K6257 in air.

5. The housing according to claim 4, wherein the tensile strength half-life is 3,000 hours or more at 180° C., as determined in an aging test according to JIS K6257 in air.

6. The housing according to claim 1, wherein the fiber-reinforced thermoplastic polymer composition comprises reinforcing fiber in an amount of 20 to 80% by weight, relative to the weight of the of the fiber-reinforced thermoplastic polymer composition.

7. The housing according to claim 1, wherein the fiber-reinforced thermoplastic polymer composition comprises a thermoplastic polymer selected from the group consisting of polyimides, phenolic resins, polyetheretherketons, polyamido-imides, polyethersulfones, polyphenylene sulfides, and polyamides.

8. The housing according to claim 7, wherein the thermoplastic polymer is polyamide 46.

9. A process for producing a housing for a radial flow compressor, the housing comprising an intake pipe, a compressor duct and an outlet pipe, wherein the process is an integrated process comprising steps of:
    (a) melt processing of a fiber-reinforced thermoplastic polymer composition thereby forming a polymer melt,
    (b) injection molding in a first shot of the polymer melt into a molding die comprising at least two cavities, thereby forming at least two members comprising at least an upper housing member and a lower housing member,
    (c) assembling the at least two members together, thereby forming a housing body comprised of the upper and lower housing members defining the intake pipe, the compressor duct and the outlet pipe with boundary spaces between the at least two members, and
    (d) fixing the assembled members to each other by injecting molding of a second shot of a thermoplastic molding composition so as to fill the boundary spaces between the at least two members.

10. The process according to claim 9, wherein the fixing of step (d) is done by infill molding.

11. A housing for a radial flow compressor obtained by the process according to claim 9.

12. The housing according to claim 9, wherein the housing is a turbocharger for automobiles.

* * * * *